United States Patent
Darnell et al.

(10) Patent No.: US 6,511,284 B2
(45) Date of Patent: Jan. 28, 2003

(54) METHODS AND APPARATUS FOR MINIMIZING GAS TURBINE ENGINE THERMAL STRESS

(75) Inventors: Jeffrey Paul Darnell, Cincinnati, OH (US); Robert Paul Czachor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/871,925

(22) Filed: Jun. 1, 2001

(65) Prior Publication Data

US 2002/0182058 A1 Dec. 5, 2002

(51) Int. Cl.⁷ ................................. F04D 29/38
(52) U.S. Cl. ................. 415/115; 415/176; 415/178
(58) Field of Search .................. 415/142, 115–117, 415/176–178, 108

(56) References Cited

U.S. PATENT DOCUMENTS

| | | |
|---|---|---|
| 4,920,742 A | 5/1990 | Nash et al. |
| 5,273,397 A | 12/1993 | Czachor et al. |
| 5,483,792 A | 1/1996 | Czachor et al. |
| 5,634,767 A | 6/1997 | Dawson |

Primary Examiner—Edward K. Look
Assistant Examiner—Dwayne J. White
(74) Attorney, Agent, or Firm—Nathan D. Herkamp; Armstrong Teasdale LLP

(57) ABSTRACT

A heat shield for a gas turbine engine hub which facilitates reducing thermal stress in an exhaust frame of a gas turbine engine. The exhaust frame includes the hub mounted within the engine with a plurality of supports. The supports extend radially outward from the hub through a primary flow cavity and facilitate flow to a secondary flow cavity. The heat shield defines the secondary flow cavity such that the secondary flow cavity is radially inward and axially adjacent the hub. The heat shield includes a plurality of thermal stress relieving corrugations.

19 Claims, 4 Drawing Sheets

METHODS AND APPARATUS FOR MINIMIZING GAS TURBINE ENGINE THERMAL STRESS

BACKGROUND OF THE INVENTION

This invention relates generally to gas turbine engines and, more particularly, to gas turbine engine exhaust frames.

Gas turbine engines include a compressor for providing compressed air to a combustor wherein the air is mixed with fuel and ignited for generating combustion gases. The combustion gases are channeled to a turbine which extracts energy from the gases for powering the compressor and generating thrust to propel the aircraft. Because turbine flowpaths which channel the combustion gases are exposed to the hot combustion gases, thermal stresses may be induced therein. Continued exposure to the thermal stresses and hot combustion gases may cause radial thermal growth of the structures including increasing the diameter and circumference of the structures.

Gas turbine engines also include an annular frame. The frame includes a casing spaced radially outwardly from an annular hub. A plurality of circumferentially spaced-apart supports extend between the casing and the hub. The casing downstream of the combustor is exposed to hot combustion gases exiting the combustor. Accordingly, supports downstream from the combustor are also subjected to hot combustion gases.

Because the hub is more massive than the casing, and because much of the annular hub is not exposed to hot combustion gases, during transient turbine engine operations, operating temperatures of the casing increase much quicker than operating temperatures of the hub. As a result of such temperature differences, thermal stresses may develop between the hub and the casing. Continued exposure to thermal stresses may facilitate low-cycle fatigue cracking and eventual failure of the frame.

BRIEF SUMMARY OF THE INVENTION

In an exemplary embodiment, a heat shield for a gas turbine engine hub reduces thermal stresses in an exhaust frame of the gas turbine engine. The hub is mounted within the engine with a plurality of supports that extend between the exhaust frame and the hub. The supports extend radially outward from the hub through a primary flow cavity and facilitate flow to a secondary flow cavity. The heat shield defines the secondary flow cavity such that the secondary flow cavity is radially inward and axially adjacent the hub. The heat shield includes a plurality of thermal stress relieving corrugations.

During operation, combustion gases flow from the primary flow cavity through the supports and into the secondary flow cavity defined by the heat shield. The combustion gases are retained adjacent the hub by the heat shield, and raise an operating temperature of the hub, thus facilitating a reduced temperature differential between the hub and the supports. Furthermore, the corrugations in the heat shield permit differential thermal expansion between the heat shield and the hub. As a result, thermal stresses between the supports, the hub, and the heat shield are facilitated to be reduced.

DETAILED DESCRIPTION OF THE INVENTION

Figure 1:
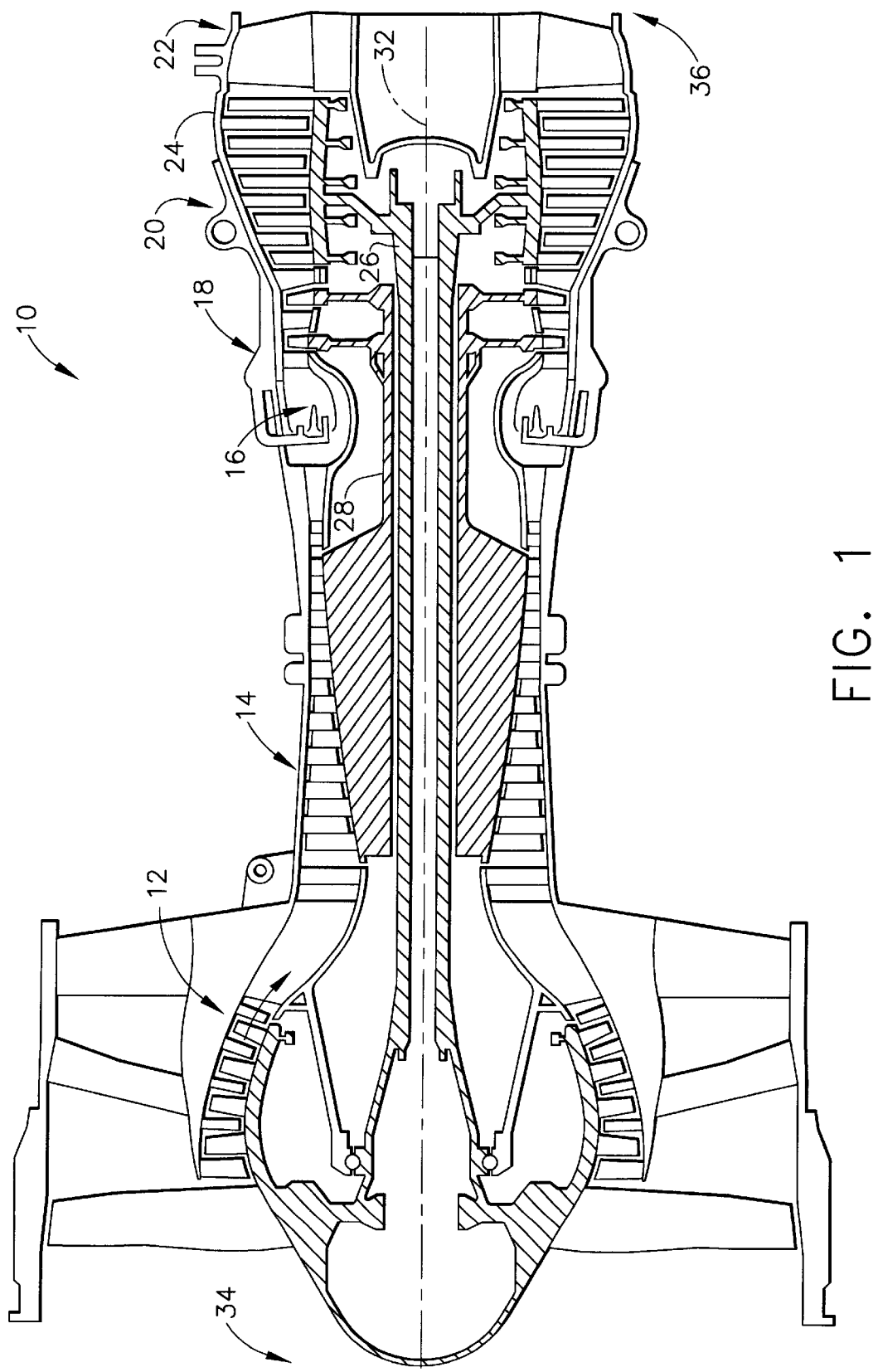
FIG. 1 is schematic illustration of a gas turbine engine.

FIG. 1 is a schematic illustration of a gas turbine engine 10 including a low-pressure compressor 12, a high-pressure compressor 14, and a combustor 16. Engine 10 also includes a high-pressure turbine 18, a low-pressure turbine 20, an exhaust frame 22 and a casing 24. A first shaft 26 couples low-pressure compressor 12 and low-pressure turbine 20, and a second shaft 28 couples high-pressure compressor 14 and high-pressure turbine 18. Engine 10 has an axis of symmetry 32 extending from an upstream side 34 of engine 10 aft to a downstream side 36 of engine 10. In one embodiment, gas turbine engine 10 is a GE90 engine commercially available from General Electric Company, Cincinnati, Ohio.

In operation, air flows through low-pressure compressor 12 and compressed air is supplied to high-pressure compressor 14. Highly compressed air is delivered to combustor 16. Combustion gases 38 from combustor 16 propel turbines 18 and 20. High pressure turbine 18 rotates second shaft 28 and high pressure compressor 14, while low pressure turbine 20 rotates first shaft 26 and low pressure compressor 12 about axis 32.

Figure 2:
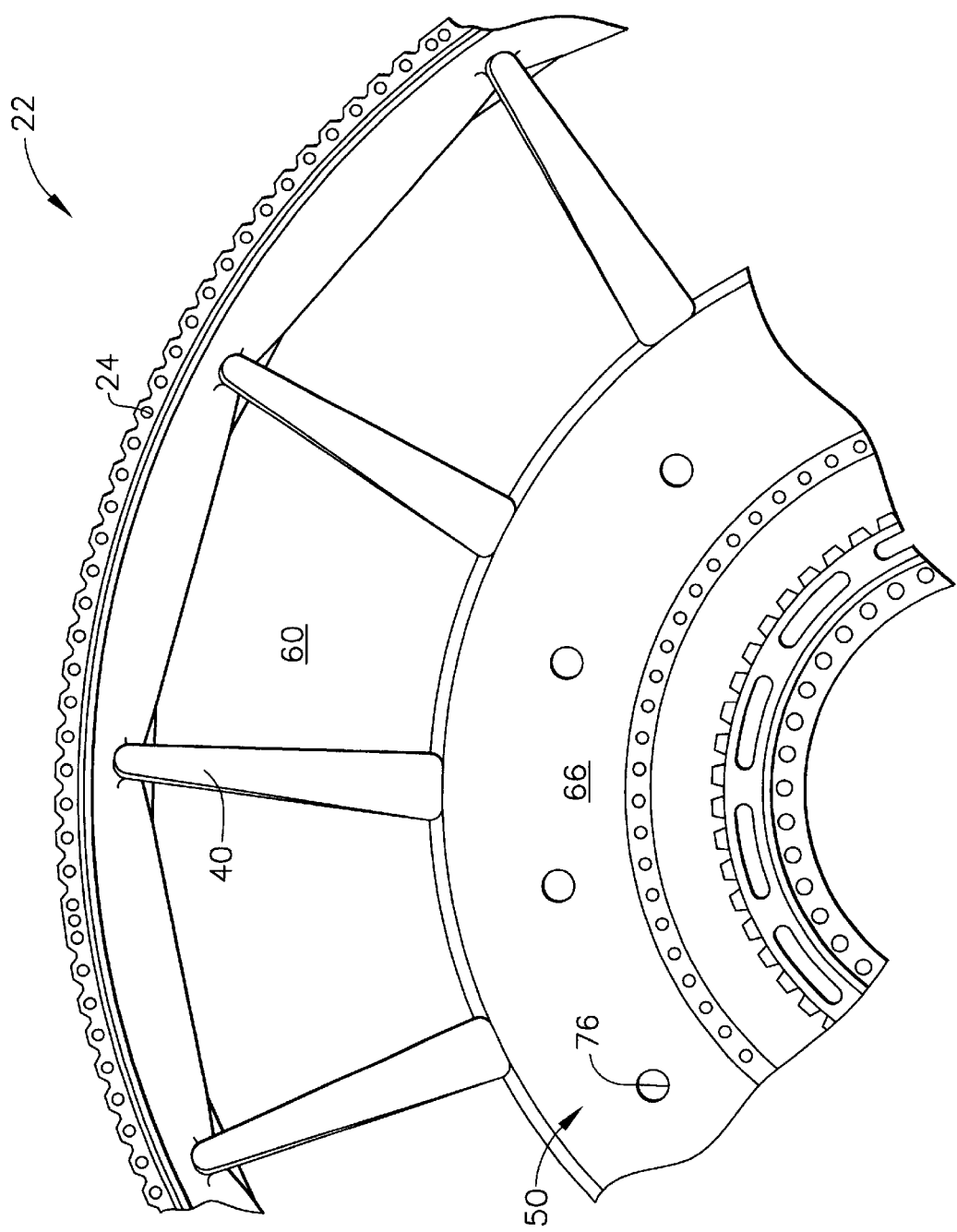
FIG. 2 is a partial, axial view of an exhaust frame which may be used with the gas turbine engine shown in FIG. 1.
Figure 3:
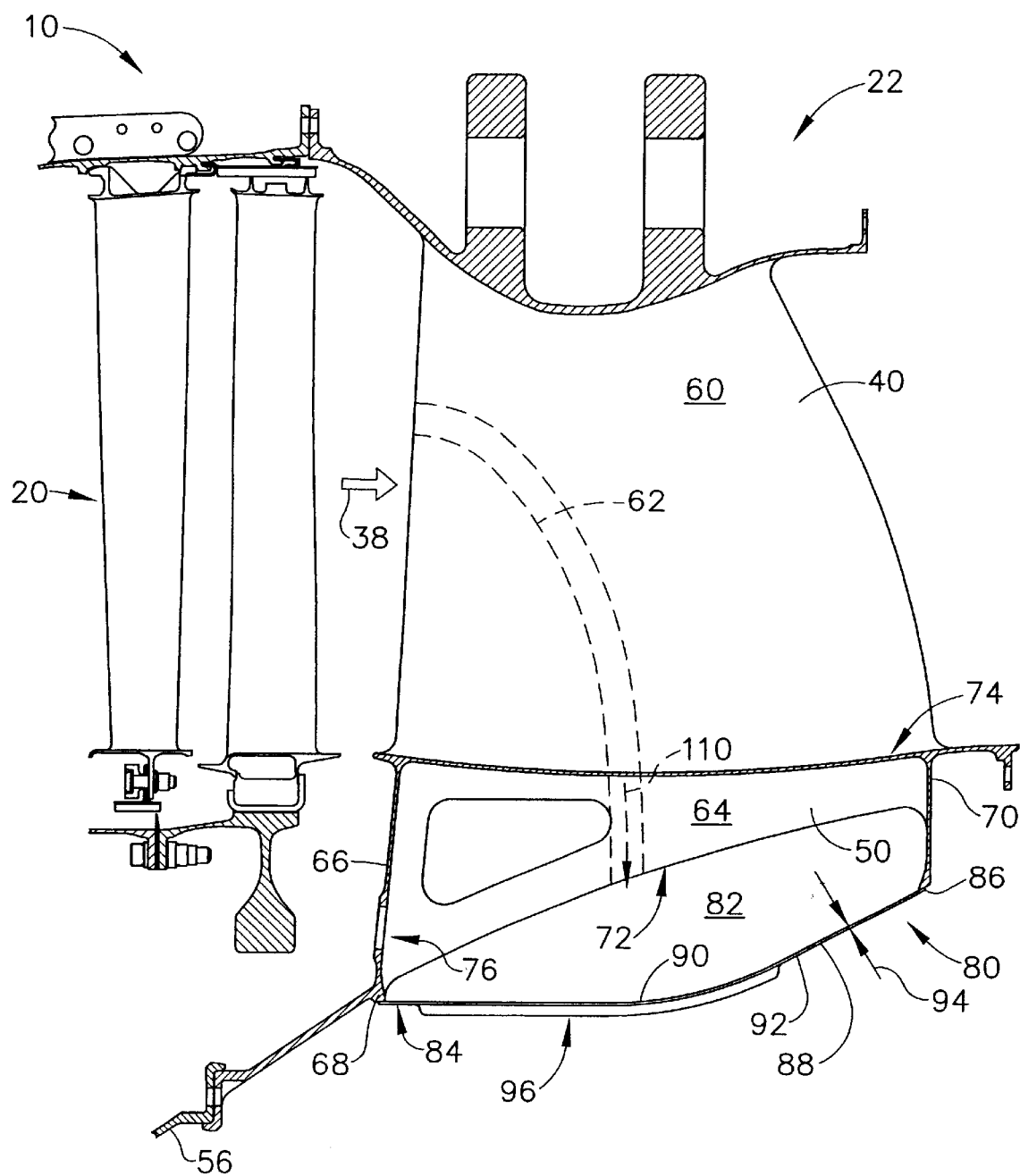
FIG. 3 is a cross-sectional schematic view of the exhaust frame shown in FIG. 2.

FIG. 2 is a partial, axial view of exhaust frame 22. FIG. 3 is a cross-sectional schematic view of exhaust frame 22. Exhaust frame 22 includes a plurality of circumferential spaced-apart and radially extending supports 40. Exhaust frame 22 also includes a hub 50 and an annular bearing support 56. Hub 50 is attached to annular bearing support 56 to support first shaft 26 (shown in FIG. 1). Supports 40, hub 50 and bearing support 56 provide a relatively rigid assembly for carrying rotor loads to casing 24 during operation of engine 10.

A primary flow cavity 60 is defined between casing 24 and hub 50. Primary flow cavity 60 is annular and extends circumferentially within casing 24. Supports 40 extend radially through primary flow cavity 60. During engine operation, combustion gases 38 flow from low-pressure turbine 20 through primary flow cavity 60. Each support 40 includes at least one conduit 62 extending between primary flow cavity 60 to below hub 50. Conduit 62 facilitates flow of combustion gases 38 within support 40 from primary flow cavity 60 to below hub 50.

Hub 50 includes a center portion 64, a forward sidewall 66, an inner rail 68, and a hub aft portion 70. Forward sidewall 66 includes a plurality of exit openings 76 that extend axially through forward sidewall 66. In the exemplary embodiment, forward sidewall exit openings 76 are located circumferentially between adjacent supports 40.

A heat shield 80 defines an annular secondary flow cavity 82 that is radially inward from and adjacent to hub 50. Conduit 62 facilitates a flow of combustion gases 38 from primary flow cavity 60 to secondary flow cavity 82. Heat shield 80 includes a forward section 84, an aft section 86 and a middle section 88. Middle section 88 includes a radial inner surface 90 and a radial outer surface 92, and has a thickness 94 extending between inner surface 90 and radial outer surface 92. In one embodiment, heat shield 80 is constructed of lightweight sheet metal and thickness 94 is 0.020 inches. In an alternative embodiment, thickness 94 is 0.125 inches. Heat shield 80 is attached to inner rail 68. In one embodiment, forward section 84 is welded to inner rail 68. In another embodiment, forward section 84 is attached to inner rail 68 with a plurality of fasteners (not shown). Heat shield 80 extends downstream radially from inner rail 68 such that heat shield aft section 86 contacts hub aft portion 70.

Figure 4:
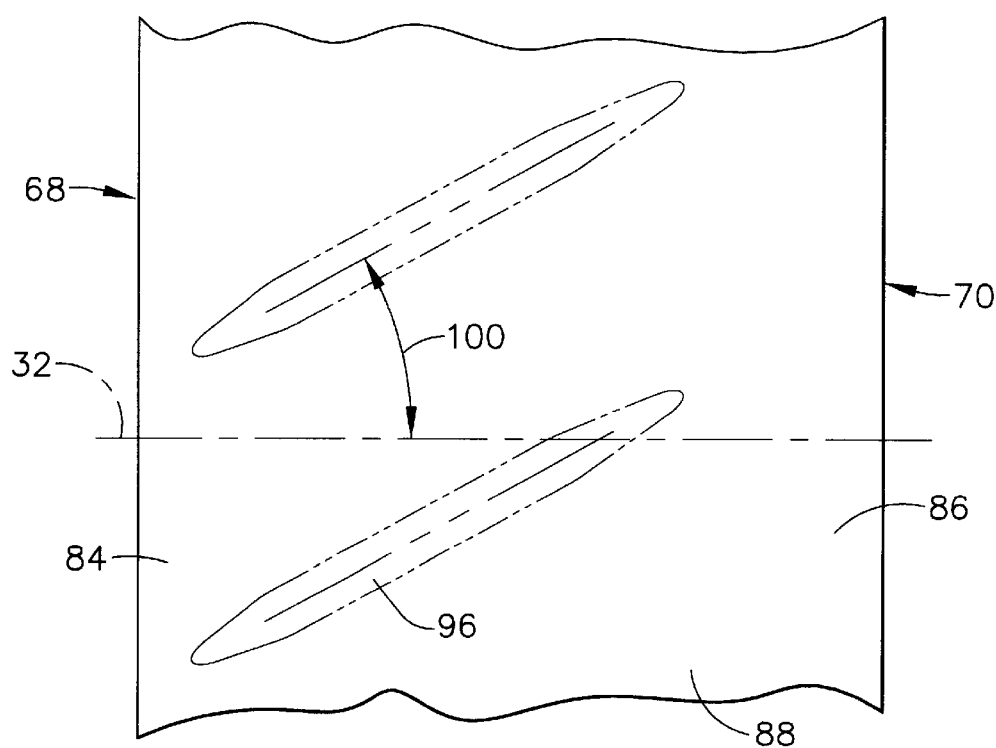
FIG. 4 is a partial, perspective radially outward view of the heat shield shown in FIG. 3.
Figure 5:
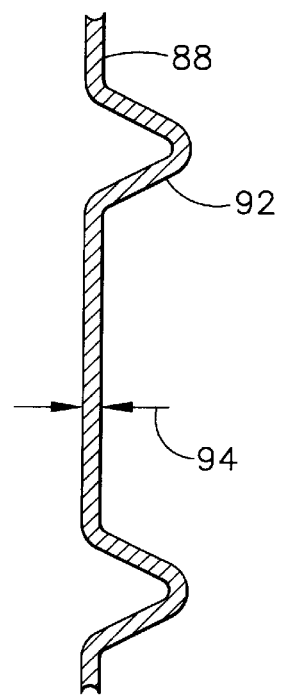
FIG. 5 is an enlarged partial cross-section of the heat shield of FIG. 4.

FIG. 4 is a partial, perspective radially outward view of heat shield 80. FIG. 5 is an enlarged partial cross-section of heat shield 80. Heat shield 80 includes a plurality of corrugations 96. Corrugations 96 provide thermal stress relief to facilitate reducing thermal expansion differences. More specifically, corrugations 96 facilitate reducing thermal stresses between hub 50 and heat shield 80. In the exemplary embodiment, corrugations 96 are smooth, rounded protrusions that extend from forward portion 84 to aft portion 86. In an alternative embodiment, corrugations 96 extend partially between forward portion 84 and aft portion 86.

In the exemplary embodiment, corrugations 96 extend radially inward and are oriented at a 45-degree angle 100 with respect to axis 32. In another embodiment, corrugations 96 are at an oblique angle 100 with respect to axis 32. In an alternative embodiment, corrugations 96 extend radially outward (not shown). In yet another alternative embodiment, corrugations 96 extend both radially inward and outward (not shown).

Referring now to FIG. 3, during operation of gas turbine engine 10 combustion gases 38 exit low-pressure turbine 20 (shown in FIG. 1) and impinge on supports 40. Conduit 62 directs a secondary flow 110 of combustion gases 38 into secondary flow cavity 82. Heat shield 80 maintains secondary flow 110 within secondary flow cavity 82 adjacent hub 50, thus facilitating reducing a temperature differential between supports 40 and hub 50. Secondary flow 110 exits secondary flow cavity 82 through exit openings 76.

As a result, thermal stresses induced between hub 50, supports 40, and heat shield 80 are facilitate to be reduced. Additionally, secondary flow 110 facilitates reducing circumferential temperature variations within hub 50, thus reducing mean stress level in exhaust frame 22.

The above-described heat shield is cost-effective and highly reliable. The exhaust frame includes a heat shield that includes corrugations to facilitate reducing thermal stresses within the hub. The heat shield maintains a secondary flow within a cavity created around the hub. As a result, an exhaust frame is provided that facilitates a gas turbine engine operating with high efficiency and performance while reducing thermal stresses induced within the exhaust frame.

While the invention has been described in terms of various specific embodiments, those skilled in the art will recognize that the invention can be practiced with modification within the spirit and scope of the claims.

What is claimed is:

1. A method for assembling a gas turbine engine exhaust frame, the exhaust frame including a primary flow cavity and a hub including a sidewall, said method comprising the steps of:
   providing a sheet metal heat shield including a plurality of thermal stress relief corrugations;
   attaching the heat shield to the sidewall, to define a secondary cavity adjacent at least a portion of the hub; and
   attaching a plurality of supports that each include a conduit to the casing such that each conduit is coupled in flow communication with the primary flow cavity and the secondary cavity.

2. A method in accordance with claim 1 wherein the sidewalls include an inner rail, said step of attaching the heat shield further comprises the step of attaching the heat shield to the inner rail, such that the heat shield defines the secondary cavity adjacent at least a portion of the hub.

3. A method in accordance with claim 1 wherein said step of attaching the heat shield further comprising the step of welding the heat shield to the sidewalls.

4. A method in accordance with claim 1 wherein said step of providing a heat shield further comprises the step of providing a heat shield including thermal stress relief corrugations that are at an oblique angle with regard to an axis of symmetry of the frame.

5. A method in accordance with claim 4 wherein said step of providing a heat shield further comprises the step of providing a heat shield including thermal stress relief corrugations that are at about a 45 degree angle with regard to an axis of symmetry of the frame.

6. An exhaust frame for a gas turbine engine including an axis of symmetry, said exhaust frame comprising:
   an annular casing;
   an hub radially inward from said casing and defining an annular primary flow cavity between said casing and said hub;
   a sheet metal heat shield defining a secondary flow cavity radially inward from said hub, said heat shield including a plurality of corrugations formed therein; and
   a plurality of supports attached to said casing, said supports extending radially inward from said casing and attached to said hub, each of said supports comprising at least a conduit in flow communication with said primary flow cavity and with said secondary flow cavity.

7. An exhaust frame in accordance with claim 6 wherein said corrugations are oriented at an oblique angle with respect to the turbine engine axis of symmetry.

8. An exhaust frame in accordance with claim 6 wherein said corrugations are oriented at a 45 degree angle with respect to the turbine engine axis of symmetry.

9. An exhaust frame in accordance with claim 6, said hub including sidewalls, said sidewalls including inner rails wherein said heat shield attached to said inner rails.

10. An exhaust frame in accordance with claim 6 wherein said corrugations extend radially inward from said heat shield.

11. An exhaust frame in accordance with claim 6 said heat shield comprising a forward portion, an aft portion and a middle portion, wherein said corrugations extend from said forward portion to said aft portion of said heat shield.

12. An exhaust frame in accordance with claim 6 wherein said heat shield comprises a thickness less than about 0.125 inches.

13. A gas turbine engine including an axis of symmetry, said turbine engine comprising:
   an exhaust frame;
   an annular casing;
   a hub radially inward from said casing and defining an annular primary flow cavity between said casing and said hub within said exhaust frame;
   a sheet metal heat shield defining a secondary flow cavity radially inward from said hub, said heat shield including a plurality of corrugations formed therein; and
   a plurality of supports attached to said casing, said supports extending radially inward from said casing and attached to said hub, each of said supports comprising at least a conduit in flow communication with said primary flow cavity, and said secondary flow cavity.

14. A gas turbine engine in accordance with claim 13 said hub including sidewalls, said sidewalls including inner rails wherein said heat shield attached to said inner rails.

15. A gas turbine engine in accordance with claim 13 wherein said corrugations extend radially inward from said heat shield.

16. A gas turbine engine in accordance with claim 13 said heat shield comprising a forward portion, an aft portion and a middle portion, wherein said corrugations extend substantially from said forward portion to said aft portion of said heat shield.

17. A gas turbine engine in accordance with claim 13 wherein said heat shield comprises a thickness less than about 0.125 inches.

18. A gas turbine engine in accordance with claim 13 wherein said corrugations are oriented at an oblique angle with respect to the turbine engine axis of symmetry.

19. A gas turbine engine in accordance with claim 13 wherein said corrugations are oriented at a 45 degree angle with respect to the turbine engine axis of symmetry.

\* \* \* \* \*